(12) United States Patent
Akiyama

(10) Patent No.: US 11,592,734 B2
(45) Date of Patent: Feb. 28, 2023

(54) DISPLAY APPARATUS AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/592,670

(22) Filed: Feb. 4, 2022

(65) Prior Publication Data
US 2022/0252968 A1    Aug. 11, 2022

(30) Foreign Application Priority Data
Feb. 5, 2021   (JP) .............................. JP2021-017645

(51) Int. Cl.
*G03B 21/20*    (2006.01)
(52) U.S. Cl.
CPC ....... *G03B 21/204* (2013.01); *G03B 21/2073* (2013.01)
(58) Field of Classification Search
CPC ............... G03B 21/204; G03B 21/207

USPC .......................................................... 353/31
See application file for complete search history.

(56) References Cited

U.S. PATENT DOCUMENTS

2013/0027670 A1   1/2013   Akiyama et al.
2020/0314397 A1   10/2020  Akiyama

FOREIGN PATENT DOCUMENTS

JP      2000-131762 A    5/2000
JP      2013-167812 A    8/2013
JP      2020-160236 A    10/2020

*Primary Examiner* — Jerry L Brooks
(74) *Attorney, Agent, or Firm* — Oliff PLC

(57) ABSTRACT

In a first period, an optical apparatus converts first light that exits out of a retardation film into light polarized in a first polarization direction and converts second light that exits out of the retardation film into light polarized in a second polarization direction, and in a second period, the optical apparatus converts the first light that exits out of the retardation film into light polarized in the second polarization direction and converts the second light that exits out of the retardation film into light polarized in the first polarization direction.

13 Claims, 9 Drawing Sheets

DISPLAY APPARATUS AND PROJECTOR

The present application is based on, and claims priority from JP Application Serial Number 2021-017645, filed Feb. 5, 2021, the disclosure of which is hereby incorporated by reference herein in its entirety.

BACKGROUND

1. Technical Field

The present disclosure relates to a display apparatus and a projector.

2. Related Art

There is a known projector that modulates the light outputted from a light source to generate image light based on image information and projects the generated image light. JP-A-2020-160236 discloses a projector including a light source apparatus, a light modulator formed out of a single liquid crystal panel, and a projection optical apparatus. In the projector, blue, red, and two green luminous fluxes having the same polarization direction are outputted from the light source apparatus, spatially separated by a microlens array provided on the light incident side of the liquid crystal panel, and caused to be incident on blue, red, and two green subpixels of each of the pixels of the liquid crystal panel.

As described above, in a projector including a single liquid crystal panel, what is called a single-plate projector, the energy density of the luminous flux radiated to each of the pixels of the liquid crystal panel is higher than that in a projector including three liquid crystal panels that modulate the red, green, and blue luminous fluxes. In particular, the blue luminous flux is more likely to cause light-radiation-induced damage to the subpixels irradiated with the blue luminous flux than the red and the green luminous fluxes. The blue subpixels of the liquid crystal panel may therefore be damaged, so that the reliability of the liquid crystal panel may be degraded.

SUMMARY

To solve the problem described above, a display apparatus according to an aspect of the present disclosure includes a light source apparatus that outputs light containing first light having a first wavelength band and second light having a second wavelength band different from the first wavelength band, an optical apparatus which the light outputted from the light source apparatus enters, and a light modulator that modulates light outputted from the optical apparatus in accordance with image information. The light modulator includes a liquid crystal panel having a plurality of pixels, and the plurality of pixels each have at least a first subpixel and a second subpixel. The optical apparatus includes a polarization separator that transmits light polarized in a first polarization direction and reflects light polarized in a second polarization direction different from the first polarization direction and a retardation film provided between the light source apparatus and the polarization separator. The optical apparatus switches along a time axis a first period to a second period and vice versa, the first period being a period in which the first light is incident on the first subpixels and the second light is incident on the second subpixels, the second period being a period in which the first light is incident on the second subpixels and the second light is incident on the first subpixels. In the first period, the optical apparatus converts the first light that exits out of the retardation film into light polarized in the first polarization direction and converts the second light that exits out of the retardation film into light polarized in the second polarization direction, and in the second period, the optical apparatus converts the first light that exits out of the retardation film into light polarized in the second polarization direction and converts the second light that exits out of the retardation film into light polarized in the first polarization direction.

A projector according to another aspect of the present disclosure includes the display apparatus according to the aspect of the present disclosure or the display apparatus according to the other aspects of the present disclosure and a projection optical apparatus that projects light outputted from the display apparatus.

DESCRIPTION OF EXEMPLARY EMBODIMENTS

First Embodiment

A first embodiment of the present disclosure will be described below with reference to the drawings.

Figure 1:
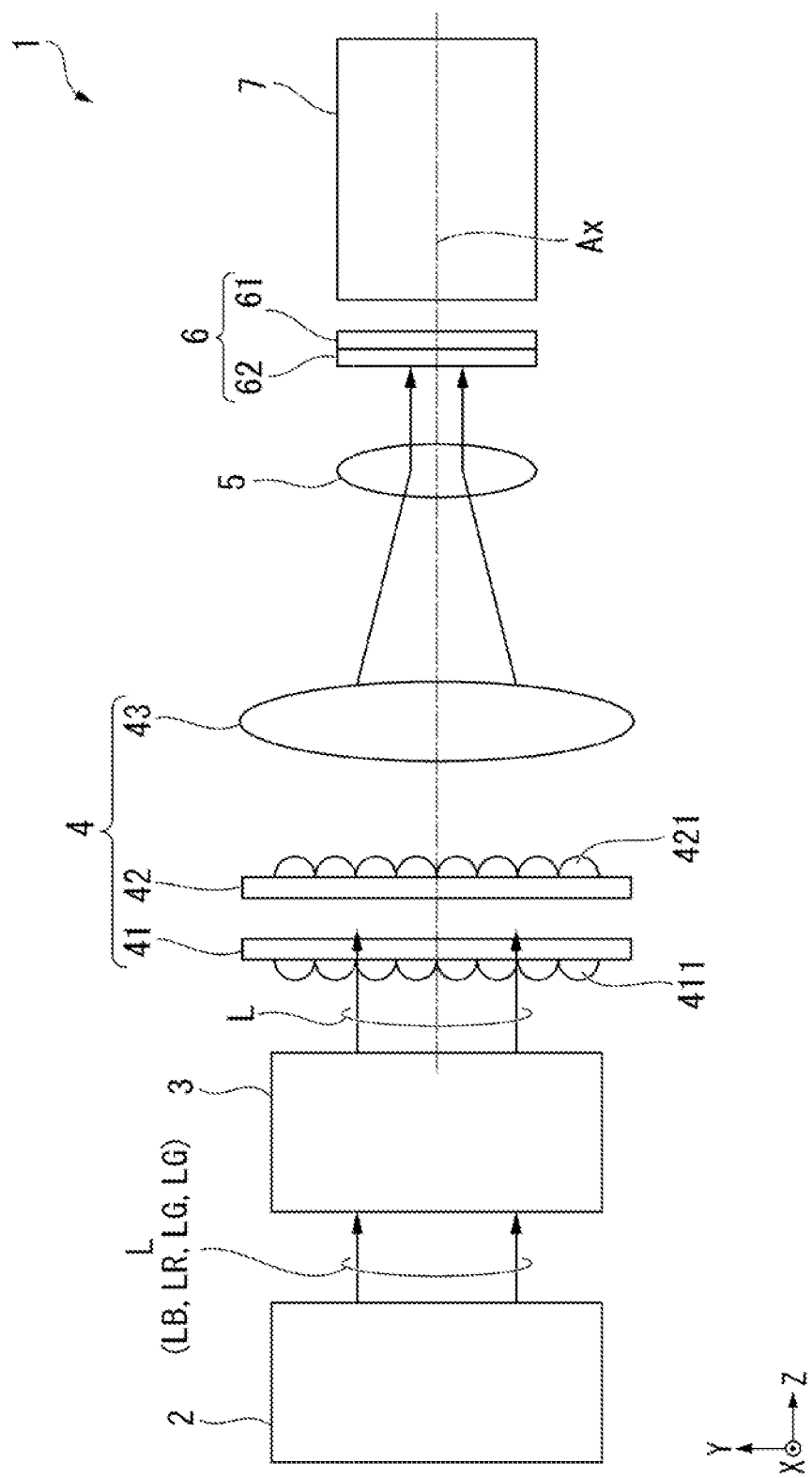
FIG. 1 is a schematic configuration diagram of a projector according to a first embodiment.
Figure 2:
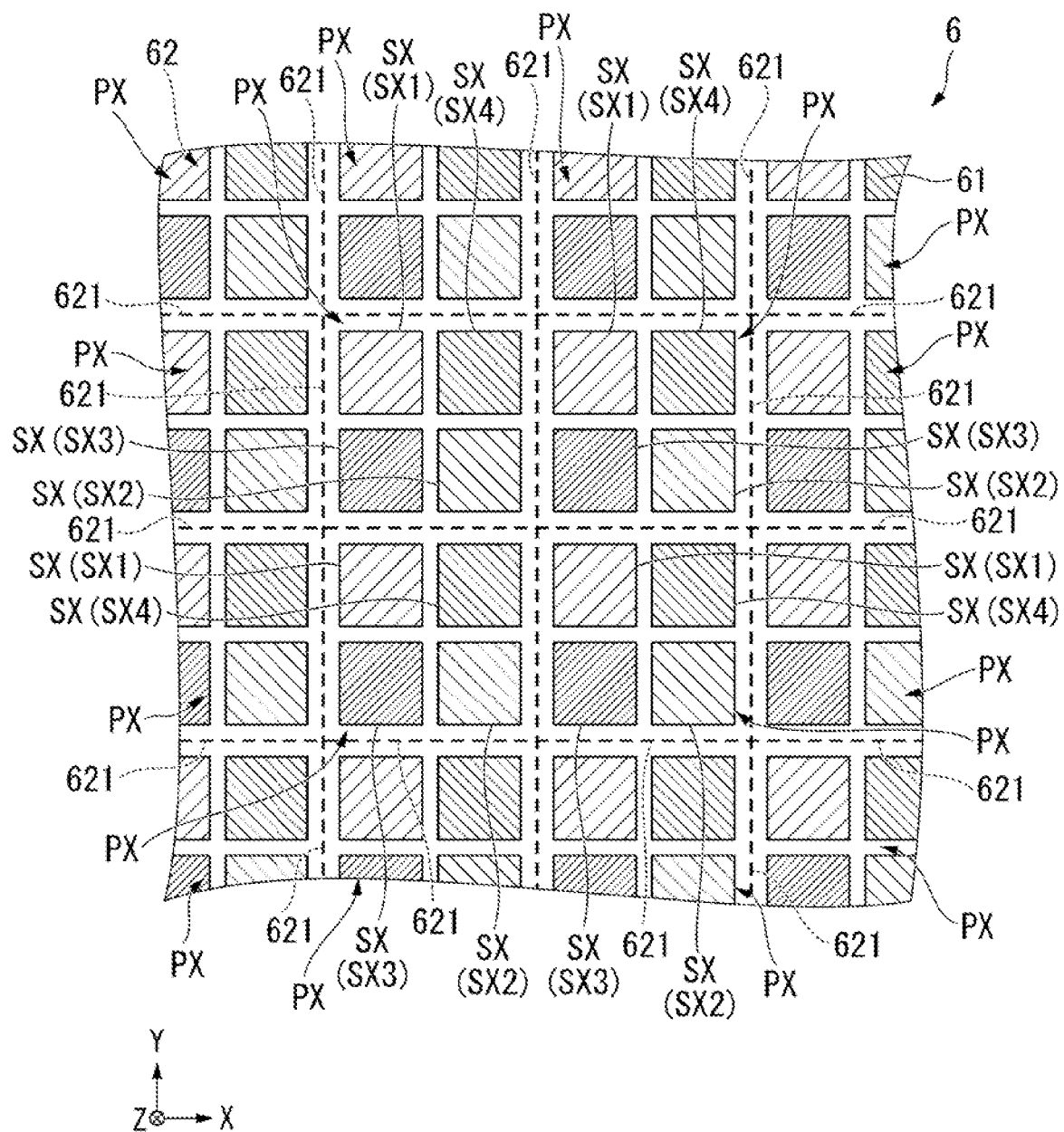
FIG. 2 is an enlarged view of a light modulator.

FIG. 1 is a schematic configuration diagram of a projector according to the first embodiment. FIG. 2 is an enlarged view of a light modulator.

In the following drawings, components are drawn at different dimensional scales in some cases for clarification of each of the components.

A projector 1 according to the present embodiment modulates light outputted from a light source apparatus 2 to form an image according to image information and enlarges and projects the formed image on a projection receiving surface, such as a screen. In other words, a single light modulator 6 including a single liquid crystal panel 61 modulates the light outputted from the light source apparatus 2 to form an image, and the projector 1 projects the formed image. The projector 1 is what is called a single-panel projector.

The projector 1 includes the light source apparatus 2, an optical apparatus 3, a homogenizer 4, a field lens 5, the light modulator 6, and a projection optical apparatus 7, as shown in FIG. 1. The light source apparatus 2, the optical apparatus 3, the homogenizer 4, the field lens 5, the light modulator 6, and the projection optical apparatus 7 are disposed in predetermined positions along a system optical axis Ax. The system optical axis Ax is the optical axis of the light source apparatus 2 and is defined as an axis extending along the traveling direction of the chief ray of light L outputted from the light source apparatus 2.

In the following description, an axis parallel to the traveling direction of the light outputted from the light source apparatus 2 along the system optical axis Ax is called an axis Z, and the light traveling direction is called a direction +Z. Two axes perpendicular to the axis Z each other are called an axis X and an axis Y. Out of the directions along the axes X, Y, and Z, the direction toward the upper side of the vertical direction in the space where the projector 1 is installed is called a direction +Y. The direction toward the right side of the horizontal direction is called a direction +X when a target object on which light is incident along the direction +Z is so viewed that the direction +Y is oriented toward the upper side of the vertical direction. Although not shown, the direction opposite the direction +X is a direction −X, the direction opposite the direction +Y is a direction −Y, and the direction opposite the direction +Z is a direction −Z.

The configurations of the light source apparatus 2 and the optical apparatus 3 will be described later in detail.

The homogenizer 4 homogenizes the illuminance of the light L outputted from the light source apparatus 2 in an image formation area of the light modulator 6, which is irradiated with the light L. The homogenizer 4 includes a first multi-lens 41, a second multi-lens 42, and a superimposing lens 43. In place of the configuration described above, a homogenizer having another configuration may be provided, or no homogenizer may be provided.

The first multi-lens 41 includes a plurality of lenses 411 arranged in a matrix in a plane perpendicular to the center axis of the light L incident from the light source apparatus 2, that is, the system optical axis Ax. The plurality of lenses 411 of the first multi-lens 41 divide the light incident from the light source apparatus 2 into a plurality of sub-luminous fluxes.

The second multi-lens 42 includes a plurality of lenses 421 arranged in a matrix in a plane perpendicular to the system optical axis Ax and corresponding to the plurality of lenses 411 of the first multi-lens 41. The lenses 421 receive the sub-luminous fluxes having exited out of the lenses 411 facing the lenses 421. The lenses 421 cause the sub-luminous fluxes to enter the superimposing lens 43.

The superimposing lens 43 superimposes the plurality of sub-luminous fluxes incident from the second multi-lens 42 with one another in the image formation area of the light modulator 6. In detail, the second multi-lens 42 and the superimposing lens 43 cause a blue luminous flux LB, a red luminous flux LR, and two green luminous fluxes LG, which have each been divided into a plurality of sub-luminous fluxes, to enter a plurality of microlenses 621, which form a microlens array 62, which will be described later, of the light modulator 6 via the field lens 5, at different angles.

The field lens 5 is disposed between the homogenizer 4 and the light modulator 6. The field lens 5 parallelizes the light L having exited out of the homogenizer 4 and guides the parallelized light L to the light modulator 6.

The light modulator 6 modulates the light outputted from the light source apparatus 2. In detail, the light modulator 6 modulates the color luminous fluxes outputted from the light source apparatus 2 and incident on the light modulator 6 via the optical apparatus 3, the homogenizer 4, and the field lens 5 in accordance with image information to form image light according to the image information. The light modulator 6 includes the single liquid crystal panel 61 and the single microlens array 62.

FIG. 2 is a diagrammatic enlarged view of part of the light modulator 6 viewed in the direction −Z. In other words, FIG. 2 shows the correspondence between pixels PX provided in the liquid crystal panel 61 and the microlenses 621 provided in the microlens array 62.

The liquid crystal panel 61 has a plurality of pixels PX arranged in a matrix in a plane perpendicular to the system optical axis Ax (axis Z), as shown in FIG. 2.

The pixels PX each have a plurality of subpixels SX, which modulate color luminous fluxes having colors different from one another. In the present embodiment, the pixels PX each have four subpixels SX (SX1 to SX4). Specifically, with respect to the center of a rectangular pixel PX, a first subpixel SX1 is disposed in a position shifted in the directions −X and +Y. A second subpixel SX2 is disposed in a position shifted in the directions +X and −Y. A third subpixel SX3 is disposed in a position shifted in the directions −X and −Y. A fourth subpixel SX4 is disposed in a position shifted in the directions +X and +Y.

The microlens array 62 is provided on the light incident side (side −Z) of the liquid crystal panel 61, as shown in FIG. 1. The microlens array 62 guides the plurality of color luminous fluxes LB, LR, and LG that enter the microlens array 62 to the individual pixels PX. The microlens array 62 includes the plurality of microlenses 621 corresponding to the plurality of pixels PX.

The plurality of microlenses 621 are arranged in a matrix in a plane perpendicular to the system optical axis Ax, as shown in FIG. 2. In other words, the plurality of microlenses 621 are arranged in a matrix in a plane perpendicular to the center axis of the light incident from the field lens 5. In the present embodiment, one microlens 621 is provided in correspondence with two subpixels arranged in the direction +X and two subpixels arranged in the direction +Y. That is, one microlens 621 is provided in correspondence with the four subpixels SX1 to SX4, which are arranged in two rows and two columns in the plane XY.

The blue luminous flux LB, the red luminous flux LR, and the two green luminous fluxes LG superimposed on one another by the homogenizer 4 are incident on each of the microlenses 621 at angles different from one another. The microlens 621 therefore cause the color luminous fluxes incident thereon to be distributed and incident on the subpixels SX corresponding to the color luminous fluxes.

The projection optical apparatus 7 projects the light modulated by the light modulator 6, that is, image forming light onto the projection receiving surface (not shown), such as a screen, as shown in FIG. 1. The projection optical apparatus 7 includes a single projection lens or a plurality of projection lenses.

The configuration of the light source apparatus 2 will be described below.

Figure 3:
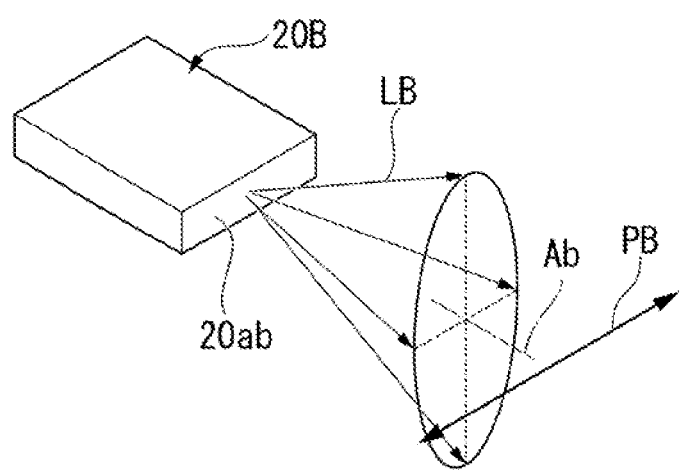
FIG. 3 shows the direction in which a blue luminous flux outputted from a blue semiconductor laser deflects.
Figure 4:
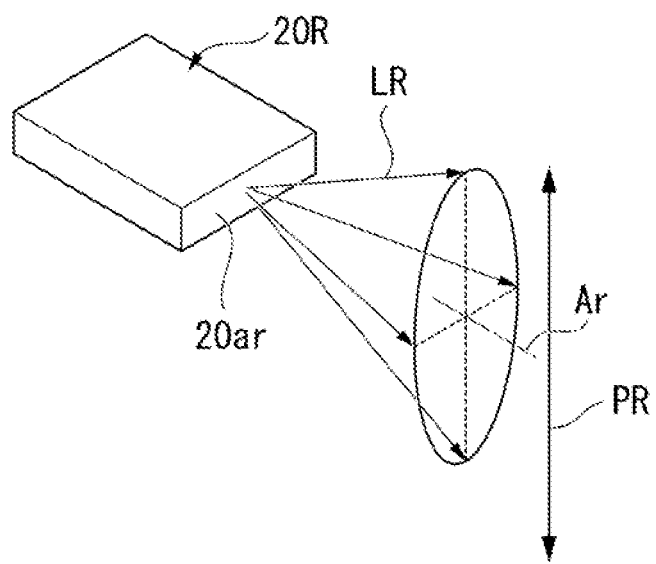
FIG. 4 shows the direction in which a red luminous flux outputted from a red semiconductor laser deflects.
Figure 5A:
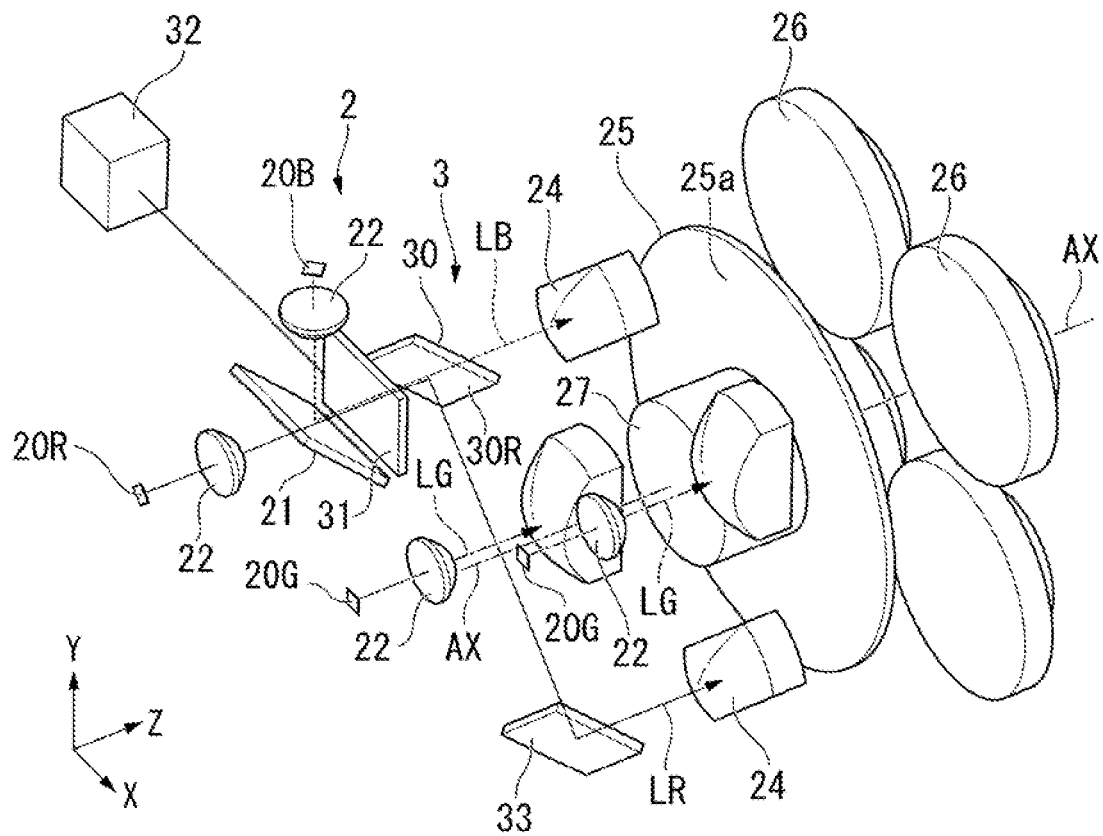
FIG. 5A is a perspective view showing the configurations of a light source apparatus and an optical apparatus in a first period.
Figure 5B:
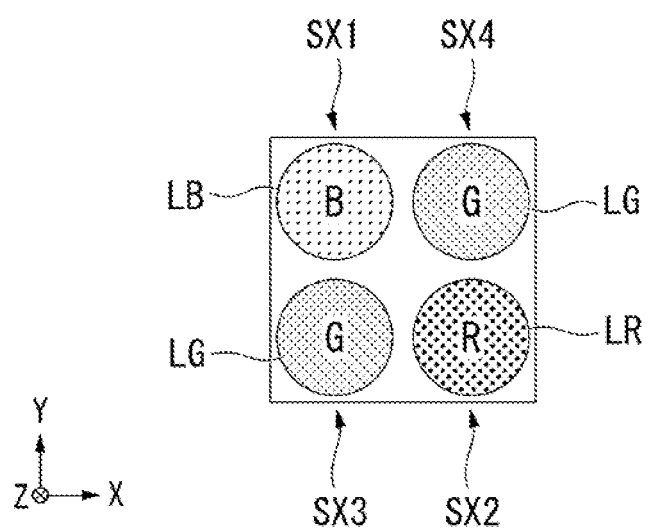
FIG. 5B is a diagrammatic view showing the positional relationship among four color luminous fluxes on a liquid crystal panel in the first period.
Figure 6A:
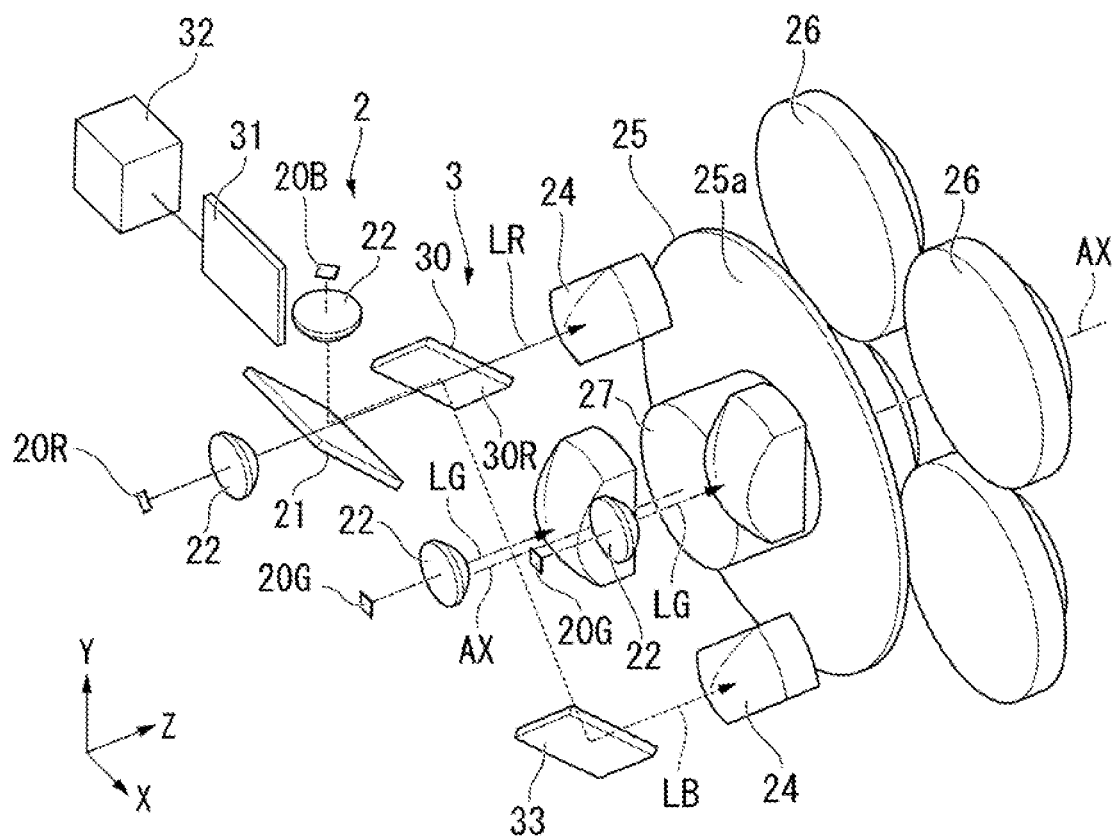
FIG. 6A is a perspective view showing the configurations of the light source apparatus and the optical apparatus in a second period.
Figure 6B:
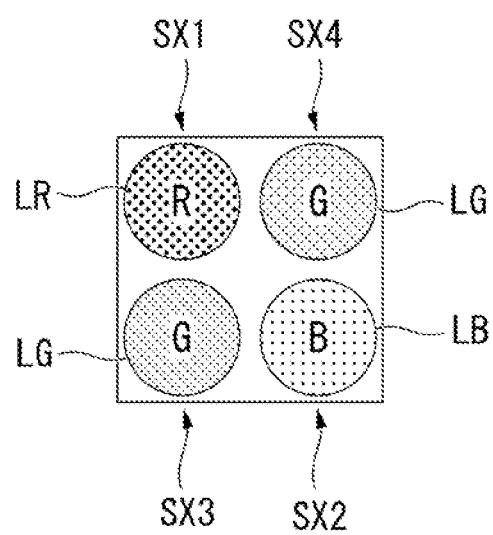
FIG. 6B is a diagrammatic view showing the positional relationship among the four color luminous fluxes on the liquid crystal panel in the second period.

FIG. 3 shows the direction in which the blue luminous flux LB outputted from a blue semiconductor laser 20B deflects. FIG. 4 shows the direction in which the red luminous flux LR outputted from a red semiconductor laser 20R deflects. FIG. 5A is a perspective view showing the configurations of the light source apparatus 2 and the optical apparatus 3 in a first period. FIG. 5B is a diagrammatic view showing the positional relationship among the four color luminous fluxes on the liquid crystal panel 61 in the first period. FIG. 6A is a perspective view showing the configurations of the light source apparatus 2 and the optical apparatus 3 in a second period. FIG. 6B is a diagrammatic view showing the positional relationship among the four color luminous fluxes on the liquid crystal panel 61 in the second period.

The light source apparatus 2 includes the blue semiconductor laser 20B, the red semiconductor laser 20R, a dichroic mirror 21, two green semiconductor lasers 20G, and four collimator lenses 22, as shown in FIGS. 5A and 6A. The light source apparatus 2 includes the four semiconductor lasers 20B, 20R, 20G, and 20G, as described above.

Four focusing lenses 24, a rotating diffuser plate 25, and four pickup lenses 26 are provided on the light exiting side of the light source apparatus 2.

The blue semiconductor laser 20B outputs the blue luminous flux LB having a wavelength band ranging, for example, from 440 to 490 nm. The red semiconductor laser 20R outputs the red luminous flux LR having a wavelength band ranging, for example, from 610 to 750 nm. The two green semiconductor lasers 20G each output the green luminous flux LG having a wavelength band ranging, for example, from 500 to 560 nm.

The blue luminous flux LB in the present embodiment corresponds to the first light having a first wavelength band in the claims. The red luminous flux LR in the present embodiment corresponds to the second light having a second wavelength band in the claims. The green luminous flux LG in the present embodiment corresponds to the third light and the fourth light each having a third wavelength band in the claims. The blue semiconductor laser 20B in the present embodiment corresponds to the first light emitter in the claims. The red semiconductor laser 20R in the present embodiment corresponds to the second light emitter in the claims.

The four collimator lenses 22 are provided on the light exiting side of the four semiconductor lasers 20B, 20R, and 20G. The collimator lenses 22 parallelize the light outputted from the semiconductor lasers 20B, 20R, and 20G corresponding to the collimator lenses 22.

The four color luminous fluxes LB, LR, LG, and LG outputted from the four semiconductor lasers 20B, 20R, and 20G are incident on four locations separate from one another on a light incident surface 25a of the rotating diffuser plate 25, as will be described later. Specifically, the four color luminous fluxes LB, LR, LG, and LG are incident on the light incident surface 25a, which is parallel to the XY plane, in a position shifted toward the sides −X and +Y, a position shifted toward the sides +X and −Y, a position shifted toward the sides −X and −Y, and a position shifted toward the sides +X and +Y with respect to the system optical axis Ax as the center. The blue semiconductor laser 20B, the red semiconductor laser 20R, and the dichroic mirror 21 are disposed in correspondence with the position shifted toward the sides −X and +Y out of the four locations described above.

The blue semiconductor laser 20B is disposed so as to output the blue luminous flux LB in the direction perpendicular to the system optical axis Ax (direction −Y). The red semiconductor laser 20R is disposed so as to output the red luminous flux LR in the direction parallel to the system optical axis Ax (direction +Z). The blue luminous flux LB outputted from the blue semiconductor laser 20B and the red luminous flux LR outputted from the red semiconductor laser 20R therefore travel in directions perpendicular to each other. The dichroic mirror 21 is disposed at the intersection of the light path of the blue luminous flux LB and the light path of the red luminous flux LR so as to incline by an angle of 45° with respect to each of the light paths.

The dichroic mirror 21 reflects the blue luminous flux LB and transmits the red luminous flux LR. The blue luminous flux LB and red luminous flux LR having passed through the dichroic mirror 21 therefore both travel in the direction +Z. The dichroic mirror 21 thus functions as a light combiner that combines the blue luminous flux LB and the red luminous flux LR with each other. In place of the configuration in the present embodiment, the position of the blue semiconductor laser 20B and the position of the red semiconductor laser 20R may be swapped, and a dichroic mirror that transmits the blue luminous flux LB and reflects the red luminous flux LR may be used.

The dichroic mirror 21 in the present embodiment corresponds to the light combiner in the claims.

Regarding the polarization direction of light, the polarization direction of the blue luminous flux LB and that of the red luminous flux LR differ from each other although the blue luminous flux LB and the red luminous flux LR travel in the same direction.

Current high-power semiconductor lasers for projectors are typically AlInGaN-based semiconductor lasers as the blue semiconductor laser and AlGaInP-based semiconductor lasers as the red semiconductor laser. As described above, the polarization direction of the blue luminous flux LB outputted from the blue semiconductor laser 20B and the polarization direction of the red luminous flux LR outputted from the red semiconductor laser 20R differ from each other due to the different constituent materials and crystal structures of the blue semiconductor laser 20B and the red semiconductor laser 20R.

The blue semiconductor laser 20B has a rectangular light exiting surface 20ab having short edges and long edges when viewed in the direction along a chief ray Ab of the blue luminous flux LB, as shown in FIG. 3. The blue luminous flux LB outputted from the blue semiconductor laser 20B has an angle of divergence in the widthwise direction of the light exiting surface 20ab that is greater than the angle of divergence in the lengthwise direction of the light exiting surface 20ab. As a result, the cross section perpendicular to the chief ray Ab of the blue luminous flux LB has an elliptical shape having a major axis along the widthwise direction of the light exiting surface 20ab and a minor axis along the lengthwise direction of the light exiting surface 20ab. A polarization direction PB of the blue luminous flux LB coincides with the lengthwise direction of the light exiting surface 20ab, that is, the widthwise direction of the elliptical cross-sectional shape.

The red semiconductor laser 20R also has an elliptical cross-section perpendicular to a chief ray Ar of the red luminous flux LR and having a major axis along the widthwise direction of a light exiting surface 20*ar* and a minor axis along the lengthwise direction of the light exiting surface 20*ar*, as shown in FIG. 4, as the blue semiconductor laser 20B does. Due to the above-mentioned difference in the constituent materials, however, a polarization direction PR of the red luminous flux LR coincides with the widthwise direction of the light exiting surface 20*ar*, that is, the direction of the major axis of the elliptical cross-sectional shape.

Therefore, when the blue luminous flux LB and the red luminous flux LR are so combined with each other by the dichroic mirror 21 that the orientation of the elliptical cross-sectional shape of the blue luminous flux LB coincides with the orientation of the elliptical cross-sectional shape of the red luminous flux LR, the polarization direction PB of the blue luminous flux LB and the polarization direction PR of the red luminous flux LR are perpendicular to each other. The blue semiconductor laser 20B and the red semiconductor laser 20R are therefore so disposed that the blue luminous flux LB is one of P-polarized light and S-polarized light with respect to a polarization separator 30 and the red luminous flux LR is the other one of P-polarized light and S-polarized light with respect to the polarization separator 30.

In contrast, the two green semiconductor lasers 20G are disposed in correspondence with the position shifted toward the sides −X and −Y and the position shifted toward the sides +X and +Y out of the four locations described above, as shown in FIGS. 5A and 6A.

The four focusing lenses 24 are provided on the light incident side of the rotating diffuser plate 25. The four focusing lenses 24 are provided in a position shifted toward the sides −X and +Y, a position shifted toward the sides +X and −Y, a position shifted toward the sides −X and −Y, and a position shifted toward the sides +X and +Y with respect to the system optical axis Ax as the center. The focusing lenses 24 bring the color luminous fluxes LB, LR, LG, and LG that enter the focusing lenses 24 into focus on the rotating diffuser plate 25.

The rotating diffuser plate 25 is provided on the light exiting side of the four focusing lenses 24. The rotating diffuser plate 25 is provided as a component common to the four focusing lenses 24. The rotating diffuser plate 25 is rotatable by a drive source 27, such as a motor, around an axis of rotation parallel to the system optical axis Ax. The rotating diffuser plate 25 diffuses at a predetermined angle of diffusion each of the color luminous fluxes LB, LR, LG, and LG incident on the rotating diffuser plate 25. The rotating diffuser plate 25 is preferable in that it reduces the optical density of the incident light to suppress heat generated by the rotating diffuser plate 25. The diffuser plate, however, does not necessarily need to be rotated.

The four pickup lenses 26 are provided on the light exiting side of the rotating diffuser plate 25. The four pickup lenses 26 are provided in a position shifted toward the sides −X and +Y, a position shifted toward the sides +X and −Y, a position shifted toward the sides −X and −Y, and a position shifted toward the sides +X and +Y with respect to the system optical axis Ax as the center. The pickup lenses 26 guide the color luminous fluxes LB, LR, LG, and LG having exited out of the rotating diffuser plate 25 to the downstream homogenizer 4.

The configuration of the optical apparatus 3 will be described below.

The optical apparatus 3 includes the polarization separator 30, a retardation film 31, a retardation film driving mechanism 32, and a total reflection mirror 33, as shown in FIGS. 5A and 6A. The optical apparatus 3 switches the first period, in which the blue luminous flux LB is incident on the first subpixels SX1 and the red luminous flux LR is incident on the second subpixels SX2, to the second period, in which the blue luminous flux LB is incident on the second subpixels SX2 and the red luminous flux LR is incident on the first subpixels SX1, and vice versa along the time axis.

The polarization separator 30 is provided in the optical path of the blue luminous flux LB and the red luminous flux LR having exited out of the dichroic mirror 21. The polarization separator 30 transmits P-polarized light with respect to a light incident surface 30*a* of the polarization separator 30 and reflects S-polarized light with respect to the light incident surface 30*a*.

The P-polarized light in the present embodiment corresponds to the light polarized in a first polarization direction in the claims. The S-polarized light in the present embodiment corresponds to the light polarized in a second polarization direction in the claims.

The angle of the polarization separator 30 is so set that the S-polarized light reflected off the polarization separator 30 moves from the position shifted toward the sides −X and +Y to the position shifted toward the sides +X and −Y in the plane XY perpendicular to the system optical axis Ax. Therefore, when viewed from the side −Z along the system optical axis Ax, the S-polarized light reflected off the polarization separator 30 travels obliquely from the position shifted toward the sides −X and +Y to the position shifted toward the sides +X and −Y (from upper left to lower right).

The retardation film 31 is provided in the optical path of the blue luminous flux LB and the red luminous flux LR that travel between the dichroic mirror 21 and the polarization separator 30. The retardation film 31 is so disposed that the optic axis of the retardation film 31 inclines by an angle of 45° with respect to each of the polarization direction of the blue luminous flux LB and the polarization direction of the red luminous flux LR. The retardation film 31 thus provides each of the blue luminous flux LB and the red luminous flux LR with a retardation of half the wavelength. That is, the retardation film 31 is formed out of what is called a broadband retardation film. The polarization directions of the blue luminous flux LB and the red luminous flux LR before and after the color luminous fluxes MB and LR pass through the retardation film 31 are therefore rotated by 90° around the chief rays of the color luminous fluxes LB and LR.

The retardation film 31 in the present embodiment is provided with the retardation film driving mechanism 32, which translates the retardation film 31 in any direction in the plane XY perpendicular to the system optical axis Ax. The retardation film 31 is thus movable into and out of the optical path of the blue luminous flux LB and the red luminous flux LR traveling between the dichroic mirror 21 and the polarization separator 30. The retardation film driving mechanism 32 is formed out of any driving mechanism including, for example, a stepper motor.

The total reflection mirror 33 is disposed in the optical path of the S-polarized light reflected off the polarization separator 30 in correspondence with the focusing lens 24 provided in the position shifted toward the sides +X and −Y out of the four locations described above. The angle of the total reflection mirror 33 is so set that the S-polarized light reflected off the polarization separator 30 and traveling from the position shifted toward the sides −X and +Y to the position shifted toward the sides +X and −Y is reflected toward the side +Z in parallel to the system optical axis Ax.

An example of how to switch the positions where the color luminous fluxes LB, LR, and LG are incident on the subpixels among the four subpixels SX1 to SX4 will be described below.

In the first period, the optical apparatus 3 controls the retardation film driving mechanism 32 to achieve the state in which the retardation film 31 is inserted into the optical path of the blue luminous flux LB and the red luminous flux LR traveling between the dichroic mirror 21 and the polarization separator 30, as shown in FIG. 5A. The polarization directions of the blue luminous flux LB and the red luminous flux LR before and after the color luminous fluxes LB and LR pass through the retardation film 31 are rotated by 90° as described above. The optical apparatus 3 thus converts the blue luminous flux LB that exits out of the retardation film 31 into P-polarized light with respect to the polarization separator 30 and converts the red luminous flux LR that exits out of the retardation film 31 into S-polarized light with respect to the polarization separator 30.

In this case, the blue luminous flux LB passes through the polarization separator 30, enters the rotating diffuser plate 25 via the focusing lens 24 from the position shifted toward the sides −X and +Y with respect to the system optical axis Ax as the center, passes through the pickup lens 26 and the homogenizer 4, and enters the light modulator 6. On the other hand, the red luminous flux LR is reflected off the polarization separator 30, is further reflected off the total reflection mirror 33, enters the rotating diffuser plate 25 via the focusing lens 24 from the position shifted toward the sides +X and −Y with respect to the system optical axis Ax as the center, passes through the pickup lens 26 and the homogenizer 4, and enters the light modulator 6.

In contrast, the green luminous fluxes LG outputted from the two green semiconductor lasers 20G each do not pass through the optical apparatus 3, therefore do not change their positions from the positions of the green semiconductor lasers 20G, enter the rotating diffuser plate 25 via the focusing lenses 24 from the position shifted toward the sides −X and −Y and the position shifted toward the sides +X and +Y with respect to the system optical axis Ax as the center, pass through the pickup lenses 26 and the homogenizer 4, and enter the light modulator 6.

As a result, in the first period, the blue luminous flux LB is incident on the first subpixels SX1, the red luminous flux LR is incident on the second subpixels SX2, the green luminous flux LG is incident on the third subpixels SX3, and the other green luminous flux LG is incident on the fourth subpixels SX4, as shown in FIG. 5B.

Thereafter, in the second period, the optical apparatus 3 controls the retardation film driving mechanism 32 to achieve the state in which the retardation film 31 is removed from the optical path of the blue luminous flux LB and the red luminous flux LR traveling between the dichroic mirror 21 and the polarization separator 30, as shown in FIG. 6A. In this process, the polarization directions of the blue luminous flux LB and the red luminous flux LR are rotated by 90° with respect to the polarization directions of the color luminous fluxes LB and LR in the first period. The optical apparatus 3 therefore converts the blue luminous flux LB that exits out of the retardation film 31 into S-polarized light with respect to the polarization separator 30 and converts the red luminous flux LR that exits out of the retardation film 31 into P-polarized light with respect to the polarization separator 30.

In this case, the red luminous flux LR passes through the polarization separator 30, enters the rotating diffuser plate 25 via the focusing lens 24 from the position shifted toward the sides −X and +Y with respect to the system optical axis Ax as the center, passes through the pickup lens 26 and the homogenizer 4, and enters the light modulator 6. On the other hand, the blue luminous flux LB is reflected off the polarization separator 30, is further reflected off the total reflection mirror 33, enters the rotating diffuser 25 via the focusing lens 24 from the position shifted toward the sides +X and −Y with respect to the system optical axis Ax as the center, passes through the pickup lens 26 and the homogenizer 4, and enters the light modulator 6. The positions of the green luminous fluxes LG do not change from those in the first period.

As a result, in the second period, the red luminous flux LR is incident on the first subpixels SX1, the blue luminous flux LB is incident on the second subpixels SX2, the green luminous flux LG is incident on the third subpixels SX3, and the other green luminous flux LG is incident on the fourth subpixels SX4, as shown in FIG. 6B. That is, in the first and second periods, the subpixels on which the blue luminous flux LB is incident and the subpixels on which the red luminous flux LR is incident are switched between the first subpixels SX1 and the second subpixels SX2.

The optical apparatus 3 does not continuously switch the first period to the second period and vice versa during image projection performed by the projector 1 but performs the switching intermittently at predetermined timings. That is, the retardation film 31 is inserted into and removed from the optical path intermittently at predetermined timings. The predetermined timings are, for example, the timing when the projector 1 is powered on or the timing when a fixed period elapses after the projector 1 starts outputting light.

In the projector 1 according to the present embodiment, since the color luminous fluxes LB and LR to be incident on the first subpixels SX1 or the second subpixels SX2 are switched from each other along the time axis, image signals supplied to the first subpixels SX1 and the second subpixels SX2 are switched from each other along the time axis in conjunction with the switching of the color luminous fluxes LB and LR to be incident on either of the two types of subpixels SX1 and SX2. That is, in accordance with whether the first or second period is currently in use, image data on the color luminous fluxes LB and LR corresponding to the period is written to the first subpixels SX1 and the second subpixels SX2 of the liquid crystal panel 61. On the other hand, irrespective of the first or second period being currently in use, image data on the green luminous fluxes LG is written to the third subpixels SX3 and the fourth subpixels SX4. The image light thus modulated by the liquid crystal panel 61 is projected by the projection optical apparatus 7 onto the projection receiving surface that is not shown, such as a screen.

Effects of First Embodiment

The projector 1 according to the present embodiment includes the light source apparatus 2, which outputs the light L containing the blue luminous flux LB and the red luminous flux LR, the optical apparatus 3, which the light outputted from the light source apparatus 2 enters, and the light modulator 6, which modulates the light outputted from the optical apparatus 3 in accordance with image information. The light modulator 6 includes the liquid crystal panel 61 having the plurality of pixels PX, and the plurality of pixels PX each have at least the first subpixel SX1 and the second subpixel SX2. The optical apparatus 3 includes the polarization separator 30, which transmits P-polarized light and reflects S-polarized light, and the retardation film 31, which is provided between the light source apparatus 2 and the polarization separator 30. The optical apparatus 3 switches the first period, in which the blue luminous flux LB is incident on the first subpixels SX1 and the red luminous flux LR is incident on the second subpixels SX2, to the second period, in which the blue luminous flux LB is incident on the second subpixels SX2 and the red luminous flux LR is incident on the first subpixels SX1, and vice versa along the time axis. In the first period, the optical apparatus 3 converts the blue luminous flux LB that exits out of the retardation film 31 into P-polarized light and converts the red luminous flux LR that exits out of the retardation film 31 into S-polarized light, and in the second period, the optical apparatus 3 converts the blue luminous flux LB that exits out of the retardation film 31 into S-polarized light and the red luminous flux LR that exits out of the retardation film 31 into P-polarized light.

According to the configuration described above, the blue luminous flux LB and the red luminous flux LR to be incident on the first subpixels SX1 or the second subpixels SX2, which form the pixels PX of the liquid crystal panel 61, are switched from one to the other along the time axis. That is, the blue luminous flux LB is not incident only on specific subpixels. The blue luminous flux LB has energy higher than that of the red luminous flux LR and the green luminous fluxes LG and is therefore likely to cause light-radiation-induced damage to the subpixels irradiated with the blue luminous flux LB. To solve the problem, in the present embodiment, the subpixels on which the blue luminous flux LB is incident are switched to another set of subpixels along the time axis, so that the damage caused by the radiation of the blue luminous flux LB can be reduced, whereby a decrease in the reliability of the liquid crystal panel 61 can be suppressed.

In the projector 1 according to the present embodiment, the retardation film 31 provides each of the blue luminous flux LB and the red luminous flux LR with a retardation of half the wavelength.

According to the configuration described above, the polarization directions of the blue luminous flux LB and the red luminous flux LR can be collectively changed only by using the single retardation film 31.

In the projector 1 according to the present embodiment, the retardation film 31 is movable into and our of the optical path of the blue luminous flux LB and the red luminous flux LR traveling between the light source apparatus 2 and the polarization separator 30.

According to the configuration described above, the polarization directions of the blue luminous flux LB and the red luminous flux LR can be collectively changed only by inserting and removing the single retardation film 31 into and out of the optical path of the blue luminous flux LB and the red luminous flux LR.

In the projector 1 according to the present embodiment, the light source apparatus 2 includes the blue semiconductor laser 20B, which outputs the blue luminous flux LB, the red semiconductor laser 20R, which outputs the red luminous flux LR, and the dichroic mirror 21, which combines the blue luminous flux LB and the red luminous flux LR with each other, and the blue semiconductor laser 20B and the red semiconductor laser 20R are so disposed that the blue luminous flux LB is one of P-polarized light and S-polarized light with respect to the polarization separator 30 and the red luminous flux LR is the other one of P-polarized light and S-polarized light with respect to the polarization separator 30.

According to the configuration described above, the blue luminous flux LB can be one of P-polarized light and S-polarized light with respect to the polarization separator 30, and the red luminous flux LR can be the other one of P-polarized light and S-polarized light with respect to the polarization separator 30 simply by disposing the blue semiconductor laser 20B and the red semiconductor laser 20R in appropriate orientations without particular use of a half-wave plate or any other component. The polarization separator 30 of the optical apparatus 3 can thus reliably separate the blue luminous flux LB and the red luminous flux LR from each other.

In the projector 1 according to the present embodiment, the light source apparatus 2 further outputs the two green luminous fluxes LG, the plurality of pixels PX each further have the third subpixel SX3 and the fourth subpixel SX4, the light modulator 6 further includes the microlens array 62 provided on the light incident side of the liquid crystal panel 61 and formed out of the microlenses 621 corresponding to the plurality of pixels, and the blue luminous flux LB, the red luminous flux LR, and the two green luminous fluxes LG enter the microlenses 621 at angles different from one another.

According to the configuration described above, the blue luminous flux LB, the red luminous flux LR, and the two green luminous fluxes LG can be spatially separated from one another and distributed to the four subpixels SX1 to SX4.

In the projector 1 according to the present embodiment, the optical apparatus 3 intermittently switches the first period to the second period and vice versa at predetermined timings.

According to the configuration described above, the first and second periods can be switched from one to the other in the period during which no image data is written to the liquid crystal panel 61, whereby the projector 1 can maintain predetermined display quality.

Second Embodiment

A second embodiment of the present disclosure will be described below.

The projector according to the second embodiment has the same configuration as that of the projector according to the first embodiment, but the configuration of the optical apparatus differs from that in the first embodiment. The overall configuration of the projector will therefore not be described.

The configuration of the light source apparatus according to the second embodiment is the same as that in the first embodiment in FIG. 5A and is therefore not shown in the figures.

The retardation film 31 of the optical apparatus 3 in the first embodiment can be inserted into and removed from the optical path of the blue luminous flux LB and the red luminous flux LR. In contrast, the retardation film of the optical apparatus in the present embodiment remains inserted into the optical path of the blue luminous flux LB and the red luminous flux LR. The retardation film in the present embodiment is, however, rotatable around an axis of rotation that intersects with the light incident surface of the retardation film. The optical apparatus therefore includes a retardation film driving mechanism that rotates the retardation film. The retardation film driving mechanism is formed out of any driving mechanism including, for example, a stepper motor. The other configurations of the projector are the same as those of the projector according to the first embodiment.

It is typically assumed that the retardation film is so disposed that the optic axis thereof inclines by the angle of 45° with respect to the polarization direction of the light incident on the retardation film. That is, the retardation film functions as a normal retarder when the optic axis of the retardation film inclines by the angle of 45° with respect to the polarization direction of the incident light. In contrast, when the optic axis of the retardation film inclines by an angle of 0° with respect to the polarization direction of the incident light, that is, when the optic axis of the retardation film is parallel to the polarization direction of the incident light, the retardation film does not function as a retarder, and the case is optically equivalent to the absence of the retardation film.

The retardation film is therefore so disposed in the first period that the optic axis thereof inclines by the angle of 45° with respect to each of the polarization direction of the blue luminous flux LB and the polarization direction of the red luminous flux LR. In this configuration, the optical apparatus operates in the same state shown in FIG. 5A in the first embodiment, with the blue luminous flux LB being incident on the first subpixels SX1, the red luminous flux LR being incident on the second subpixels SX2, the green luminous flux LG being incident on the third subpixels SX3, and the other green luminous flux LG being incident on the fourth subpixels SX4, as shown in FIG. 5B.

The retardation film is then rotated in the second period by 45° from the state in the first period so that the optic axis of the retardation film inclines by the angle of 0° with respect to the polarization direction of one of the blue luminous flux LB and the red luminous flux LR. In this configuration, even with the retardation film being present in the optical path, the optical apparatus operates in substantially the same state shown in FIG. 6A in the first embodiment, with the red luminous flux LR being incident on the first subpixels SX1, the blue luminous flux LB being incident on the second subpixels SX2, the green luminous flux LG being incident on the third subpixels SX3, and the other green luminous flux LG being incident on the fourth subpixels SX4, as shown in FIG. 6B.

Also in the present embodiment, the optical apparatus is configured to rotate the retardation film intermittently at predetermined timings, instead of rotating the retardation film continuously, during the image projection performed by the projector, as in the first embodiment. The predetermined timings are, for example, the timing when the projector is powered on or the timing when a fixed period elapses after the projector starts outputting light.

Also in the present embodiment, since the color luminous fluxes LB and LR to be incident on the first subpixels SX1 or the second subpixels SX2 are switched from each other along the time axis, image signals supplied to the two types of subpixels SX1 and SX2 are switched from each other along the time axis in conjunction with the switching of the color luminous fluxes LB and LR. That is, in accordance with the first or second period being currently in use, image data on the color luminous fluxes corresponding to the period is written to the first subpixels SX1 and the second subpixels SX2 of the liquid crystal panel 61.

Effects of Second Embodiment

Also in the projector according to the present embodiment, the same effects provided by the first embodiment can be provided, such as the reduction in the damage caused by radiation of the blue luminous flux LB, and the suppression of the decrease in the reliability of the liquid crystal panel 61.

In the projector according to the present embodiment, the retardation film is rotatable around an axis of rotation that intersects with the light incident surface of the retardation film.

According to the configuration described above, the polarization directions of the blue luminous flux LB and the red luminous flux LR can be collectively changed only by rotating the single retardation film by 45° in the optical path of the blue luminous flux LB and the red luminous flux LR.

Third Embodiment

A third embodiment of the present disclosure will be described below with reference to the drawings.

The projector according to the third embodiment has the same configuration as the projector according to the first embodiment, but the configurations of the light source apparatus and the optical apparatus differ from those in the first embodiment. The overall configuration of the projector will therefore not be described.

Figure 7A:
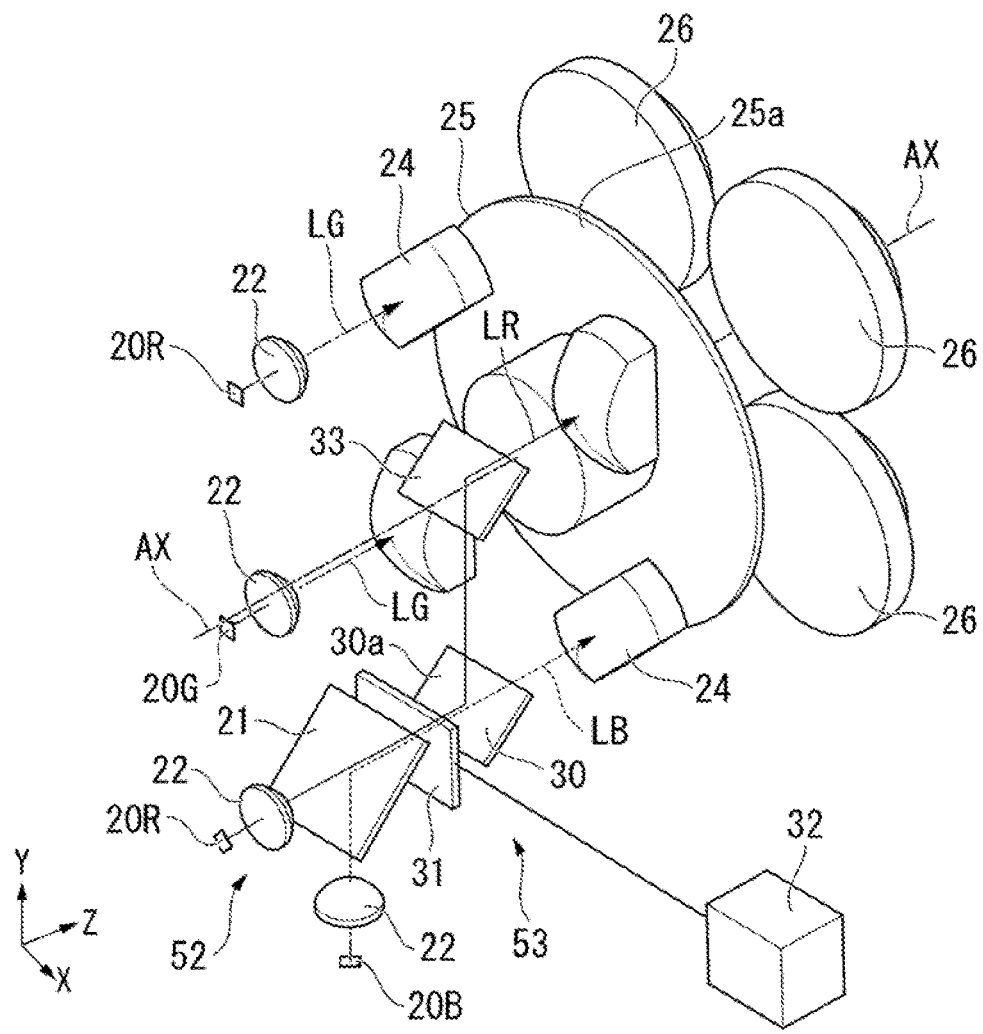
FIG. 7A is a perspective view showing the configurations of the light source apparatus and the optical apparatus of the projector according to a third embodiment in the first period.
Figure 7B:
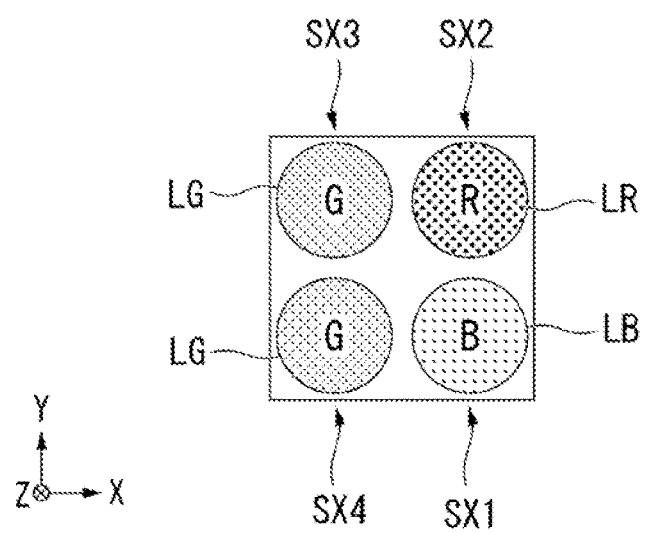
FIG. 7B is a diagrammatic view showing the positional relationship among the four color luminous fluxes on the liquid crystal panel in the first period.
Figure 8A:
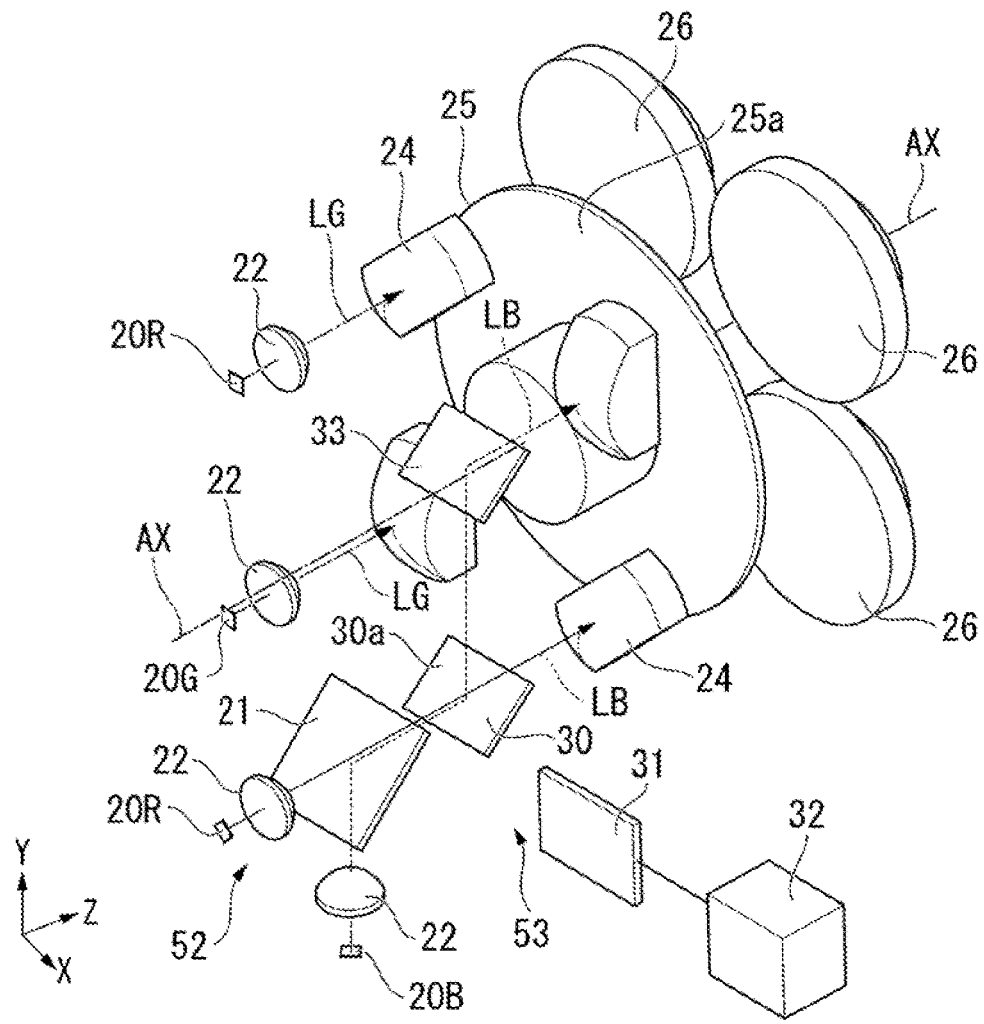
FIG. 8A is a perspective view showing the configurations of the light source apparatus and the optical apparatus in the second period.
Figure 8B:
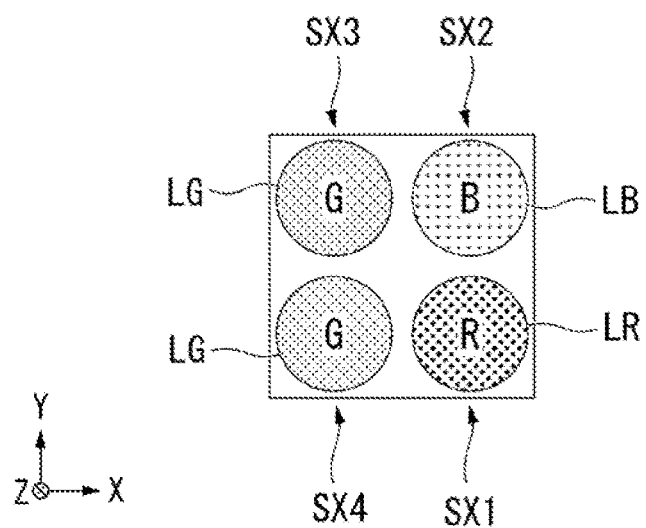
FIG. 8B is a diagrammatic view showing the positional relationship among the four color luminous fluxes on the liquid crystal panel in the second period.

FIG. 7A is a perspective view showing the configurations of a light source apparatus 52 and an optical apparatus 53 of the projector according to the present embodiment in the first period. FIG. 7B is a diagrammatic view showing the positional relationship among the four color luminous fluxes on the liquid crystal panel 61 in the first period. FIG. 8A is a perspective view showing the configurations of the light source apparatus 52 and the optical apparatus 53 in the second period. FIG. 8B is a diagrammatic view showing the positional relationship among the four color luminous fluxes on the liquid crystal panel 61 in the second period.

In the drawings used in the present embodiment, components common to those in the drawings used in the first embodiment have the same reference characters and will not be described.

In the projector according to the present embodiment, the light source apparatus 52 includes the blue semiconductor laser 20B, the red semiconductor laser 20R, the dichroic mirror 21, the two green semiconductor lasers 20G, and the four collimator lenses 22, as shown in FIGS. 7A and 8A.

The four color luminous fluxes LB, LR, LG, and LG outputted from the four semiconductor lasers 20B, 20R, 20G, and 20G are incident on a position shifted toward the sides −X and +Y, a position shifted toward the sides +X and −Y, a position shifted toward the sides −X and −Y, and a position shifted toward the sides +X and +Y with respect to the system optical axis Ax as the center, as in the first embodiment. In the present embodiment, the blue semiconductor laser 20B, the red semiconductor laser 20R, and the dichroic mirror 21 are disposed in correspondence with the position shifted toward the sides +X and −Y out of the four locations described above. The two green semiconductor lasers 20G are disposed in correspondence with the position shifted toward the sides −X and −Y and the position shifted toward the sides −X and +Y out of the four locations described above.

The optical apparatus 53 includes the polarization separator 30, the retardation film 31, the retardation film driving mechanism 32, and the total reflection mirror 33. The optical apparatus 53 switches the first period, in which the blue luminous flux LB is incident on the first subpixels SX1 and the red luminous flux LR is incident on the second subpixels SX2, to the second period, in which the blue luminous flux LB is incident on the second subpixels SX2 and the red luminous flux LR is incident on the first subpixels SX1, and vice versa along the time axis.

The angle of the polarization separator 30 is so set that S-polarized light incident on the polarization separator 30 in the direction −Z is reflected in the plane YZ and travels in the direction +Y. Therefore, when viewed from the side −Z along the system optical axis Ax, the S-polarized light reflected off the polarization separator 30 travels from the position shifted toward the sides +X and −Y to the position shifted toward the sides +X and +Y (from below to above).

The retardation film driving mechanism 32 can move the retardation film 31 into and out of the optical path of the blue luminous flux LB and the red luminous flux LR traveling between the dichroic mirror 21 and the polarization separator 30, as in the first embodiment.

The total reflection mirror 33 is disposed in the optical path of the S-polarized light reflected off the polarization separator 30 in correspondence with the position shifted toward the sides +X and +Y out of the four locations described above. The angle of the total reflection mirror 33 is so set that the S-polarized light reflected off the polarization separator 30 and traveling from the side −Y toward the side +Y is reflected toward the side +Z in parallel to the system optical axis Ax.

An example of how to switch the positions where the color luminous fluxes LB, LR, and LG are incident on the subpixels among the four subpixels SX1 to SX4s will be described below.

In the present embodiment, the positional relationship among the four subpixels SX1 to SX4 differs from that in the first embodiment, and the first subpixels SX1 are each disposed in a position shifted in the directions +X and −Y with respect to the center of the pixel PX. The second subpixels SX2 are each disposed in a position shifted in the directions +X and +Y. The third subpixels SX3 are each disposed in a position shifted in the directions −X and +Y. The fourth subpixels SX4 are each disposed in a position shifted in the directions −X and −Y.

In the first period, the optical apparatus 53 achieves the state in which the retardation film 31 is inserted into the optical path of the blue luminous flux LB and the red luminous flux LR traveling between the dichroic mirror 21 and the polarization separator 30, as shown in FIG. 7A. The optical apparatus 53 thus converts the blue luminous flux LB that exits out of the retardation film 31 into P-polarized light with respect to the polarization separator 30 and converts the red luminous flux LR that exits out of the retardation film 31 into S-polarized light with respect to the polarization separator 30.

In this case, the blue luminous flux LB passes through the polarization separator 30, enters the rotating diffuser plate 25 via the focusing lens 24 from the position shifted toward the sides +X and −Y with respect to the system optical axis Ax as the center, passes through the pickup lens 26 and the homogenizer 4, and enters the light modulator 6. On the other hand, the red luminous flux LR is reflected off the polarization separator 30, is further reflected off the total reflection mirror 33, enters the rotating diffuser plate 25 via the focusing lens 24 from the position shifted toward the sides +X and +Y with respect to the system optical axis Ax as the center, passes through the pickup lens 26 and the homogenizer 4, and enters the light modulator 6. The two green luminous fluxes LG enter the light modulator 6 from the position shifted toward the sides −X and +Y and the position shifted toward the sides −X and −Y with respect to the system optical axis Ax as the center.

As a result, in the first period, the blue luminous flux LB is incident on the first subpixels SX1, the red luminous flux LR is incident on the second subpixels SX2, the green luminous flux LG is incident on the third subpixels SX3, and the other green luminous flux LG is incident on the fourth subpixels SX4, as shown in FIG. 7B.

Thereafter, in the second period, the optical apparatus 53 achieves the state in which the retardation film 31 is removed from the optical path of the blue luminous flux LB and the red luminous flux LR traveling between the dichroic mirror 21 and the polarization separator 30, as shown in FIG. 8A. The optical apparatus 53 thus converts the blue luminous flux LB that exits out of the retardation film 31 into S-polarized light with respect to the polarization separator 30 and converts the red luminous flux LR that exits out of the retardation film 31 into P-polarized light with respect to the polarization separator 30.

In this case, the red luminous flux LR passes through the polarization separator 30, enters the rotating diffuser plate 25 via the focusing lens 24 from the position shifted toward the sides +X and −Y with respect to the system optical axis Ax as the center, passes through the pickup lens 26 and the homogenizer 4, and enters the light modulator 6. On the other hand, the blue luminous flux LB is reflected off the polarization separator 30, is further reflected off the total reflection mirror 33, enters the rotating diffuser plate 25 via the focusing lens 24 from the position shifted toward the sides +X and +Y with respect to the system optical axis Ax as the center, passes through the pickup lens 26 and the homogenizer 4, and enters the light modulator 6. The positions of the green luminous fluxes LG do not change from those in the first period.

As a result, in the second period, the red luminous flux LR is incident on the first subpixels SX1, the blue luminous flux LB is incident on the second subpixels SX2, the green luminous flux LG is incident on the third subpixels SX3, and the other green luminous flux LG is incident on the fourth subpixels SX4, as shown in FIG. 8B. That is, in the first and second periods, the subpixels on which the blue luminous flux LB is incident and the subpixels on which the red luminous flux LR is incident are switched between the first subpixels SX1 and the second subpixels SX2.

The optical apparatus 53 intermittently switches the first period to the second period and vice versa at predetermined timings. That is, the retardation film 31 is inserted into and removed from the optical path intermittently at predetermined timings. The predetermined timings are, for example, the timing when the projector is powered on or the timing when a fixed period elapses after the projector starts outputting light.

In the projector according to the present embodiment, since the color luminous fluxes LB and LR to be incident on the first subpixels SX1 or the second subpixels SX2 are switched from each other along the time axis, image signals supplied to the first subpixels SX1 and the second subpixels SX2 are switched from each other along the time axis in conjunction with the switching of the color luminous fluxes LB and LR to be incident on either of the two types of subpixels SX1 and SX2. That is, in accordance with whether the first or second period is currently in use, image data on the color luminous fluxes LB and LR corresponding to the period is written to the first subpixels SX1 and the second subpixels SX2 of the liquid crystal panel 61.

Effects of Third Embodiment

Also in the projector according to the present embodiment, the same effects provided by the first embodiment can be provided, such as the reduction in the damage caused by radiation of the blue luminous flux LB, and the suppression of the decrease in the reliability of the liquid crystal panel 61.

Fourth Embodiment

A fourth embodiment of the present disclosure will be described below.

The projector according to the fourth embodiment has the same configuration as that of the projector according to the third embodiment, but the configuration of the light source apparatus differs from that in the third embodiment. The overall configuration of the projector will therefore not be described.

The configuration of the light source apparatus according to the fourth embodiment is the same as that in the third embodiment in FIG. 7A and is therefore not shown in the figures.

In the projector according to the present embodiment, the retardation film of the optical apparatus is rotatable around an axis of rotation that intersects with the light incident surface of the retardation film. The optical apparatus therefore has the same function as the optical apparatus 53 in the third embodiment, in which the retardation film is inserted into and removed from the optical path, as described in the second embodiment. The other configurations of the projector are the same as those of the projector according to the third embodiment.

Effects of Fourth Embodiment

Also in the projector according to the present embodiment, the same effects provided by the first embodiment can be provided, such as the reduction in the damage caused by radiation of the blue luminous flux LB, and the suppression of the decrease in the reliability of the liquid crystal panel 61.

Fifth Embodiment

A fifth embodiment of the present disclosure will be described below with reference to the drawings.

The projector according to the fifth embodiment has the same configuration as that of the projector according to the first embodiment, but the configurations of the light source apparatus and the optical apparatus differ from those in the first embodiment. The overall configuration of the projector will therefore not be described.

Figure 9A:
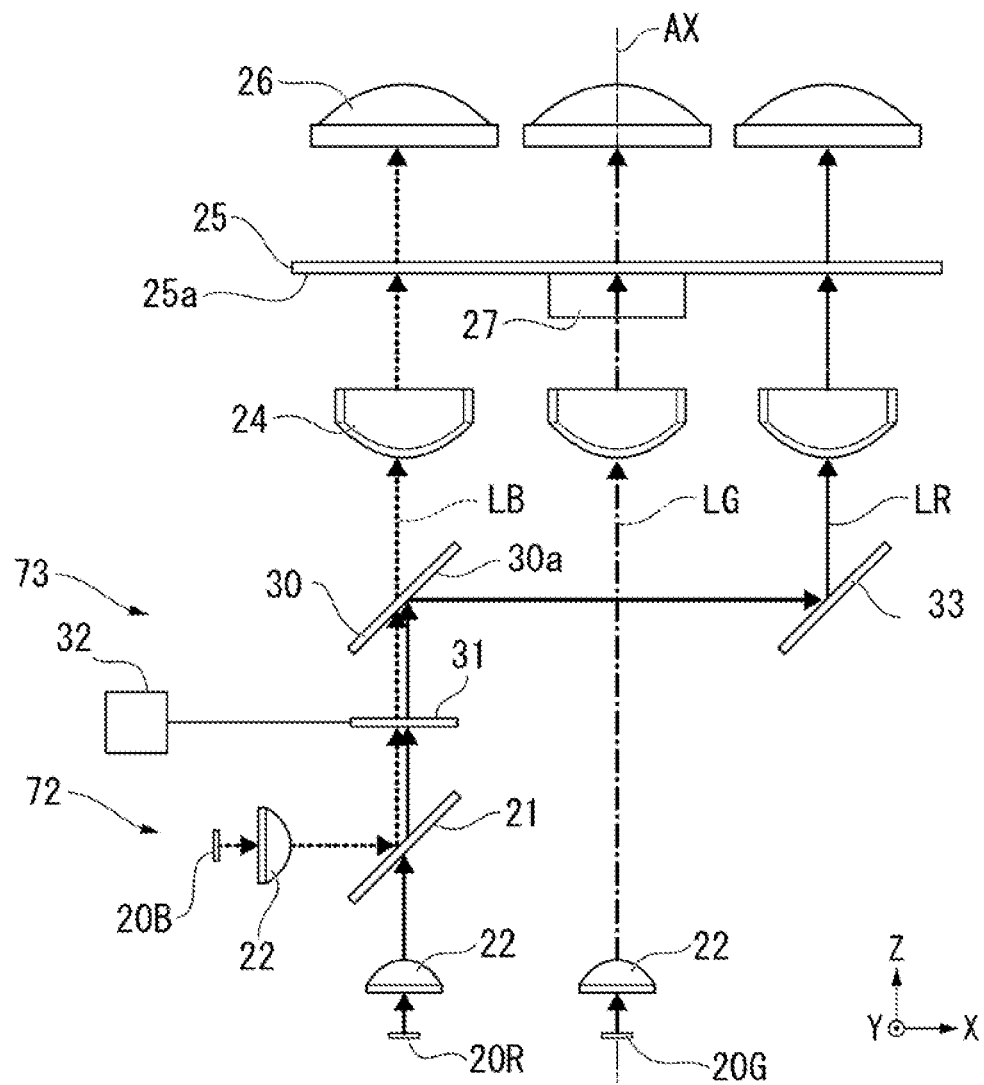
FIG. 9A is a plan view showing the configurations of the light source apparatus and the optical apparatus of the projector according to a fifth embodiment in the first period.
Figure 9B:
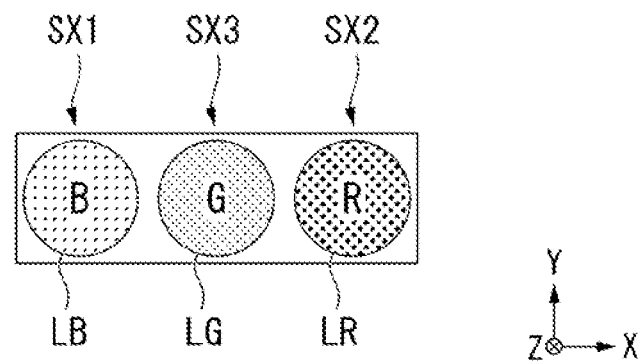
FIG. 9B is a diagrammatic view showing the positional relationship a long three color luminous fluxes on the liquid crystal panel in the first period.
Figure 10A:
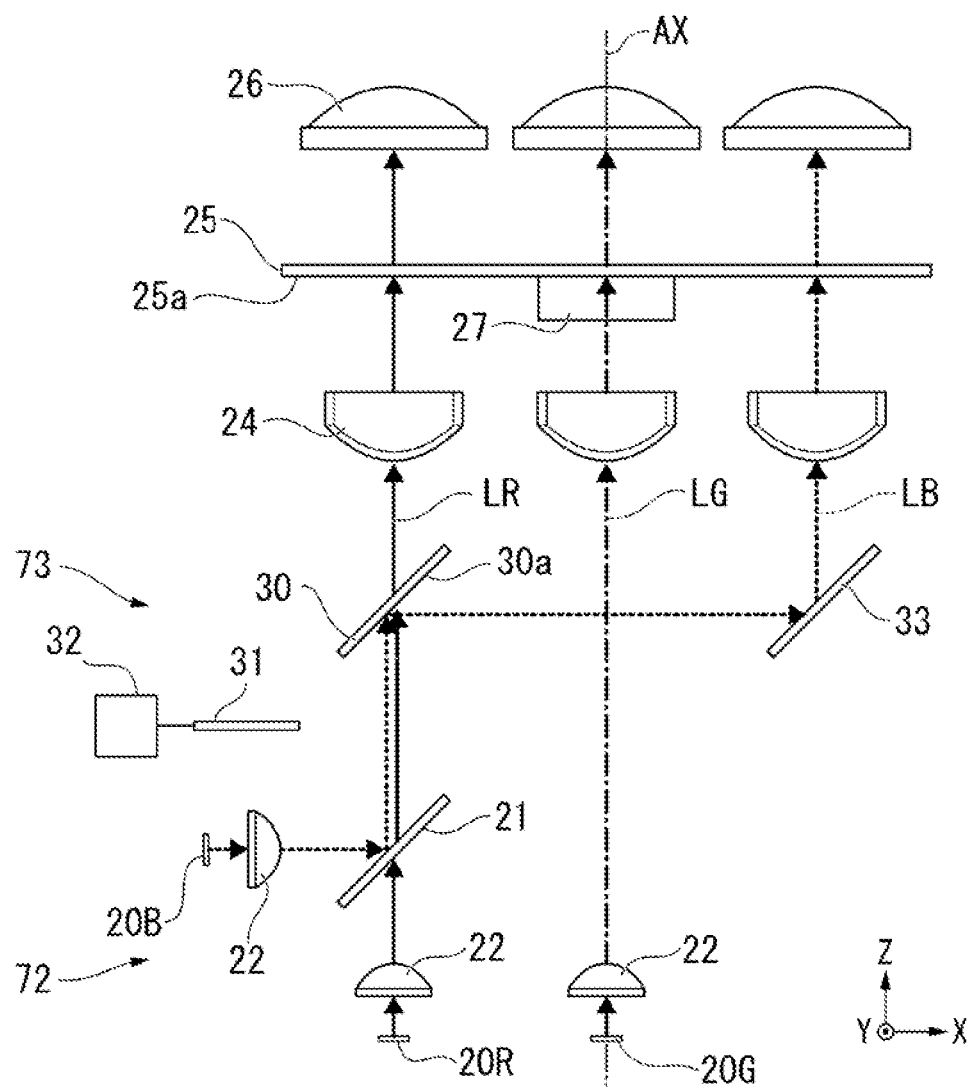
FIG. 10A is a plan view showing the configurations of the light source apparatus and the optical apparatus in the second period.
Figure 10B:
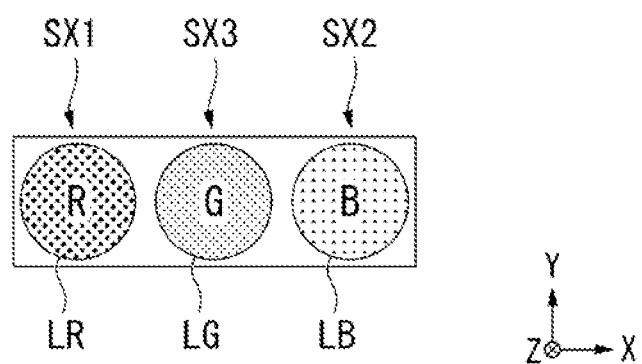
FIG. 10B is a diagrammatic view showing the positional relationship among the three color luminous fluxes on the liquid crystal panel in the second period.

FIG. 9A is a plan view showing the configurations of a light source apparatus 72 and an optical apparatus 73 of the projector according to the present embodiment in the first period. FIG. 9B is a diagrammatic view showing the positional relationship among the three color luminous fluxes on the liquid crystal panel in the first period. FIG. 10A is a plan view showing the configurations of the light source apparatus 72 and the optical apparatus 73 in the second period. FIG. 10B is a diagrammatic view showing the positional relationship among the three color luminous fluxes on the liquid crystal panel in the second period.

In the drawings used in the present embodiment, components common to those in the drawings used in the first embodiment have the same reference characters and will not be described.

In the projector according to the present embodiment, the light source apparatus 72 includes the blue semiconductor laser 20B, the red semiconductor laser 20R, the dichroic mirror 21, and the green semiconductor laser 20G, as shown in FIGS. 9A and 10A.

The three color luminous fluxes LB, LR, and LG outputted from the three semiconductor lasers 20B, 20R, and 20G are incident on the light incident surface 25a of the rotating diffuser plate 25, specifically, in a position on the side −X, a position on the side +X, and a middle position between the two positions described above with respect to the system optical axis Ax as the center. The blue semiconductor laser 20B, the red semiconductor laser 20R, and the dichroic mirror 21 are disposed in correspondence with the position on the side −X out of the three locations described above. The green semiconductor laser 20G is disposed in correspondence with the middle position.

The blue semiconductor laser 20B is disposed so as to output the blue luminous flux LB in the direction perpendicular to the system optical axis Ax (direction +X). On the other hand, the red semiconductor laser 20R is disposed so as to output the red luminous flux LR in the direction parallel to the system optical axis Ax (direction +Z). The blue luminous flux LB outputted from the blue semiconductor laser 20B and the red luminous flux LR outputted from the red semiconductor laser 20R therefore travel in directions perpendicular to each other. The dichroic mirror 21 is disposed at the intersection of the light path of the blue luminous flux LB and the light path of the red luminous flux LR so as to incline by an angle of 45° with respect to each of the light paths.

The dichroic mirror 21 reflects the blue luminous flux LB and transmits the red luminous flux LR. The blue luminous flux LB and red luminous flux LR having passed through the dichroic mirror 21 therefore both travel in the direction +Z. In place of the configuration in the present embodiment, the position of the blue semiconductor laser 20B and the position of the red semiconductor laser 20R can be swapped, and a dichroic mirror that transmits the blue luminous flux LB and reflects the red luminous flux LR may be used. Also in the present embodiment, the blue luminous flux LB and the red luminous flux LR are so combined with each other by the dichroic mirror 21 that the orientation of the elliptical cross-sectional shape of the blue luminous flux LB and the orientation of the elliptical cross-sectional shape of the red luminous flux LR coincide with each other, as in the first embodiment. In this process, the polarization direction of the blue luminous flux LB and that of the red luminous flux LR are perpendicular to each other.

In the present embodiment, the plurality of pixels of the liquid crystal panel each have three subpixels. The first subpixel SX1 is disposed in a position on the side −X with respect to the center of the pixel PX. The second subpixel SX2 is disposed in a position on the side +X with respect to the center of the pixel PX. The third subpixel SX3 is disposed at the center of the pixel PX.

An example of how to switch the positions where the color luminous fluxes LB, LR, and LG are incident on the subpixels among the three subpixels SX1 to SX3 will be described below.

In the first period, the optical apparatus 73 achieves the state in which the retardation film 31 is inserted into the optical path of the blue luminous flux LB and the red luminous flux LR traveling between the dichroic mirror 21 and the polarization separator 30, as shown in FIG. 9A. The optical apparatus 73 thus converts the blue luminous flux LB that exits out of the retardation film 31 into P-polarized light with respect to the polarization separator 30 and converts the red luminous flux LR that exits out of the retardation film 31 into S-polarized light with respect to the polarization separator 30.

In this case, the blue luminous flux LB passes through the polarization separator 30, enters the rotating diffuser plate 25 via the focusing lens 24 from the position on the side −X with respect to the system optical axis Ax as the center, passes through the pickup lens 26 and the homogenizer, and enters the light modulator. On the other hand, the red luminous flux LR is reflected off the polarization separator 30, is further reflected off the total reflection mirror 33, enters the rotating diffuser plate 25 via the focusing lens 24 from the position on the side +X with respect to the system optical axis Ax as the center, passes through the pickup lens 26 and the homogenizer, and enters the light modulator. The green luminous flux LG enters the light modulator from the position between the blue luminous flux LB and the red luminous flux LR. The blue luminous flux LB, the red luminous flux LR, and the green luminous flux LG enter the lenses of the lens array at angles different from one another.

As a result, in the first period, the blue luminous flux LB is incident on the first subpixels SX1, the red luminous flux LR is incident on the second subpixels SX2, and the green luminous flux LG is incident on the third subpixels SX3, as shown in FIG. 9B.

Thereafter, in the second period, the optical apparatus 73 achieves the state in which the retardation film 31 is removed from the optical path of the blue luminous flux LB and the red luminous flux LR traveling between the dichroic mirror 21 and the polarization separator 30, as shown in FIG. 10A. The optical apparatus 73 thus converts the blue luminous flux LB that exits out of the retardation film 31 into S-polarized light with respect to the polarization separator 30 and converts the red luminous flux LR that exits out of the retardation film 31 into P-polarized light with respect to the polarization separator 30.

In this case, the red luminous flux LR passes through the polarization separator 30, enters the rotating diffuser plate 25 via the focusing lens 24 from the position on the side −X with respect to the system optical axis Ax as the center, passes through the pickup lens 26 and the homogenizer, and enters the light modulator. On the other hand, the blue luminous flux LB is reflected off the polarization separator 30, is further reflected off the total reflection mirror 33, enters the rotating diffuser plate 25 via the focusing lens 24 from the position on the side +X with respect to the system optical axis Ax as the center, passes through the pickup lens 26 and the homogenizer, and enters the light modulator. The position of the green luminous flux LG does not change from that in the first period.

As a result, in the second period, the red luminous flux LR is incident on the first subpixels SX1, the blue luminous flux LB is incident on the second subpixels SX2, and the green luminous flux LG is incident on the third subpixels SX3, as shown in FIG. 10B. That is, in the first and second periods, the subpixels on which the blue luminous flux LB is incident and the subpixels on which the red luminous flux LR is incident are switched between the first subpixels SX1 and the second subpixels SX2.

The optical apparatus 73 intermittently switches the first period to the second period and vice versa at predetermined timings. That is, the retardation film 31 is inserted into and removed from the optical path intermittently at predetermined timings. The predetermined timings are, for example, the timing when the projector is powered on or the timing when a fixed period elapses after the projector starts outputting light.

In the projector according to the present embodiment, since the color luminous fluxes LB and LR to be incident on the first subpixels SX1 or the second subpixels SX2 are switched from each other along the time axis, image signals supplied to the first subpixels SX1 and the second subpixels SX2 are switched from each other along the time axis in conjunction with the switching of the color luminous fluxes LB and LR to be incident on either of the two types of subpixels SX1 and SX2. That is, in accordance with the first or second period being currently in use, image data on the color luminous fluxes LB and LR corresponding to the period is written to the first subpixels SX1 and the second subpixels SX2 of the liquid crystal panel.

Effects of Fifth Embodiment

Also in the projector according to the present embodiment, the same effects provided by the first embodiment can be provided, such as the reduction in the damage caused by radiation of the blue luminous flux LB, and the suppression of the decrease in the reliability of the liquid crystal panel 61.

Sixth Embodiment

A sixth embodiment of the present disclosure will be described below.

The projector according to the sixth embodiment has the same configuration as that of the projector according to the fifth embodiment, but the configuration of the light source apparatus differs from that in the fifth embodiment. The overall configuration of the projector will therefore not be described.

The configuration of the light source apparatus according to the sixth embodiment is the same as that in the fifth embodiment in FIG. 9A and is therefore not shown in the figures.

In the projector according to the present embodiment, the retardation film of the optical apparatus is rotatable around an axis of rotation that intersects with the light incident surface of the retardation film. The optical apparatus therefore has the same function as that of the optical apparatus 73 according to the fifth embodiment, in which the retardation film is inserted into and removed from the optical path, as described in the second embodiment. The other configurations of the projector are the same as those of the projector according to the fifth embodiment.

Effects of Sixth Embodiment

Also in the projector according to the present embodiment, the same effects provided by the first embodiment can be provided, such as the reduction in the damage caused by radiation of the blue luminous flux LB, and the suppression of the decrease in the reliability of the liquid crystal panel 61.

The technical scope of the present disclosure is not limited to the embodiments described above, and a variety of changes can be made thereto to the extent that the changes do not depart from the substance of the present disclosure.

For example, the specific descriptions of the shape, the number, the arrangement, and other factors of the components of the projectors are not limited to those in the embodiments described above and can be changed as appropriate. The present disclosure may also be applied to a display apparatus including no projection optical apparatus.

A display apparatus according to an aspect of the present disclosure may have the configuration below.

The display apparatus according to the aspect of the present disclosure includes a light source apparatus that outputs light containing first light having a first wavelength band and second light having a second wavelength band different from the first wavelength band, an optical apparatus which the light outputted from the light source apparatus enters, and a light modulator that modulates the light outputted from the optical apparatus in accordance with image information. The light modulator includes a liquid crystal panel having a plurality of pixels. The plurality of pixels each have at least a first subpixel and a second subpixel. The optical apparatus includes a polarization separator that transmits light polarized in a first polarization direction and reflects light polarized in a second polarization direction different from the first polarization direction and a retardation film provided between the light source apparatus and the polarization separator. The optical apparatus switches along the time axis a first period to a second period and vice versa, the first period being a period in which the first light is incident on the first subpixels and the second light is incident on the second subpixels, the second period being a period in which the first light is incident on the second subpixels and the second light is incident on the first subpixels. In the first period, the optical apparatus converts the first light that exits out of the retardation film into light polarized in the first polarization direction and converts the second light that exits out of the retardation film into light polarized in the second polarization direction. In the second period, the optical apparatus converts the first light that exits out of the retardation film into light polarized in the second polarization direction and converts the second light that exits out of the retardation film into light polarized in the first polarization direction.

In the display apparatus according to the aspect of the present disclosure, the retardation film may provide each of light having the first wavelength band and light having the second wavelength band with a retardation of half the wavelength.

In the display apparatus according to the aspect of the present disclosure, the retardation film may be movable into and out of the optical path of the light traveling between the light source apparatus and the polarization separator.

In the display apparatus according to the aspect of the present disclosure, the retardation film may have a light incident surface and may be rotatable around an axis of rotation that intersects with the light incident surface.

In the display apparatus according to the aspect of the present disclosure, in the first period, the optic axis of the retardation film may incline by an angle of 45° to the polarization directions of the incident first light and the second light, and in the second period, the optic axis of the retardation film may be parallel to the polarization directions of the incident first light and second light.

In the display apparatus according to the aspect of the present disclosure, the light source apparatus may include a first light emitter that emits the first light, a second light emitter that emits the second light, and a light combiner that combines the first light and the second light with each other. The first and second light emitters may be so disposed that the first light is one of the light polarized in the first polarization direction and the light polarized in the second polarization direction with respect to the polarization separator, and that the second light is the other one of the light polarized in the first polarization direction and the light polarized in the second polarization direction with respect to the polarization separator.

In the display apparatus according to the aspect of the present disclosure, the light combiner may reflect the first light emitted from the first light emitter and transmit the second light emitted from the second light emitter to combine the first light and the second light with each other.

In the display apparatus according to the aspect of the present disclosure, the light source apparatus may further output third light having a third wavelength band different from the first and second wavelength bands. The plurality of pixels may each further have a third subpixel. The light modulator may further include a lens array provided on the light incident side of the liquid crystal panel. The lens array may include lenses corresponding to the plurality of pixels. The first light, the second light, and the third light may enter the lenses at angles different from one another.

In the display apparatus according to the aspect of the present disclosure, the first light may be blue light, the second light may be red light, and the third light may be green light.

In the display apparatus according to the aspect of the present disclosure, the light source apparatus may further output fourth light having the third wavelength band. The plurality of pixels may each further have a fourth subpixel. The first light, the second light, the third light, and the fourth light may enter the lenses at angles different from one another.

In the display apparatus according to the aspect of the present disclosure, the first light may be blue light, the second light may be red light, the third light may be green light, and the fourth light may be green light.

In the display apparatus according to the aspect of the present disclosure, the optical apparatus may intermittently switch the first period to the second period and vice versa at predetermined timings.

A projector according to another aspect of the present disclosure may have the configuration below.

The projector according to the other aspect of the present disclosure includes the display apparatus according to the aspect of the present disclosure and a projection optical apparatus that projects the light outputted from the display apparatus.

What is claimed is:

1. A display apparatus comprises:
a light source apparatus that outputs light containing first light having a first wavelength band and second light having a second wavelength band different from the first wavelength band;
an optical apparatus which the light outputted from the light source apparatus enters; and
a light modulator that modulates light outputted from the optical apparatus in accordance with image information,
wherein the light modulator includes a liquid crystal panel having a plurality of pixels,
the plurality of pixels each have at least a first subpixel and a second subpixel,
the optical apparatus includes a polarization separator that transmits light polarized in a first polarization direction and reflects light polarized in a second polarization direction different from the first polarization direction and a retardation film provided between the light source apparatus and the polarization separator,
the optical apparatus switches along a time axis a first period to a second period and vice versa, the first period being a period in which the first light is incident on the first subpixels and the second light is incident on the second subpixels, the second period being a period in which the first light is incident on the second subpixels and the second light is incident on the first subpixels,
in the first period, the optical apparatus converts the first light that exits out of the retardation film into light polarized in the first polarization direction and converts the second light that exits out of the retardation film into light polarized in the second polarization direction, and
in the second period, the optical apparatus converts the first light that exits out of the retardation film into light polarized in the second polarization direction and converts the second light that exits out of the retardation film into light polarized in the first polarization direction.

2. The display apparatus according to claim 1, wherein the retardation film provides each of light having the first wavelength band and light having the second wavelength band with a retardation of half the wavelength.

3. The display apparatus according to claim 1, wherein the retardation film is movable into and out of an optical path of the light traveling between the light source apparatus and the polarization separator.

4. The display apparatus according to claim 1, wherein the retardation film has a light incident surface and is rotatable around an axis of rotation that intersects with the light incident surface.

5. The display apparatus according to claim 4,
wherein in the first period, an optic axis of the retardation film inclines by an angle of 45° with respect to the polarization directions of the incident first light and the second light, and
in the second period, the optic axis of the retardation film is parallel to the polarization directions of the incident first light and second light.

6. The display apparatus according to claim 1,
wherein the light source apparatus includes a first light emitter that emits the first light, a second light emitter that emits the second light, and a light combiner that combines the first light and the second light with each other, and
the first and second light emitters are so disposed that the first light is one of the light polarized in the first polarization direction and the light polarized in the second polarization direction with respect to the polarization separator, and that the second light is another of the light polarized in the first polarization direction and the light polarized in the second polarization direction with respect to the polarization separator.

7. The display apparatus according to claim 6, wherein the light combiner reflects the first light emitted from the first light emitter and transmits the second light emitted from the second light emitter to combine the first light and the second light with each other.

8. The display apparatus according to claim 1,
wherein the light source apparatus further outputs third light having a third wavelength band different from the first and second wavelength bands,
the plurality of pixels each further have a third subpixel,
the light modulator further includes a lens array provided on a light incident side of the liquid crystal panel,
the lens array includes lenses corresponding to the plurality of pixels, and
the first light, the second light, and the third light enter the lenses at angles different from one another.

9. The display apparatus according to claim 8, wherein the first light is blue light, the second light is red light, and the third light is green light.

10. The display apparatus according to claim 8,
wherein the light source apparatus further outputs fourth light having the third wavelength band,
the plurality of pixels each further have a fourth subpixel, and
the first light, the second light, the third light, and the fourth light enter the lenses at angles different from one another.

11. The display apparatus according to claim 10, wherein the first light is blue light, the second light is red light, the third light is green light, and the fourth light is green light.

12. The display apparatus according to claim 1, wherein the optical apparatus intermittently switches the first period to the second period and vice versa at predetermined timings.

13. A projector comprising:
the display apparatus according to claim 1; and
a projection optical apparatus that projects light outputted from the display apparatus.

* * * * *